(12) United States Patent
Morikawa et al.

(10) Patent No.: US 6,649,084 B2
(45) Date of Patent: Nov. 18, 2003

(54) POLYISOCYANATE CURING AGENT FOR LAMINATE ADHESIVE, AND LAMINATE ADHESIVE USING THE SAME

(75) Inventors: Yukihiro Morikawa, Yokohama (JP); Ichiro Higashikubo, Yokohama (JP); Kouji Yoshida, Yokohama (JP); Toshiaki Sasahara, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 09/911,713

(22) Filed: Jul. 25, 2001

(65) Prior Publication Data

US 2003/0055197 A1 Mar. 20, 2003

(51) Int. Cl.$^7$ .................. C07C 271/12; C07C 271/24; C08G 18/71
(52) U.S. Cl. .................. 252/182.22; 252/182.2; 252/182.21; 528/28; 528/49; 528/69
(58) Field of Search .................. 252/182.2, 182.21, 252/182.22; 528/28, 49, 69

(56) References Cited

FOREIGN PATENT DOCUMENTS

| JP | 60-015419 A | 1/1985 |
|---|---|---|
| JP | 63 110272 A | 5/1988 |
| JP | 05-051574 A | 3/1993 |
| JP | 05-112766 A | 5/1993 |
| JP | 07-048429 A | 2/1995 |
| JP | 09 316422 A | 12/1997 |
| JP | 11-050036 A | 2/1999 |
| JP | 11-181394 A | 7/1999 |

*Primary Examiner*—Rabon Sergent
(74) *Attorney, Agent, or Firm*—Browdy and Neimark, P.L.L.C.

(57) ABSTRACT

A polyisocyanate curing agent comprising an isocyanate group-terminated prepolymer and a silane coupling agent represented by formula (2), OCN—(CH2)x—Si(OR')3      (2)

wherein R is an alkyl group having 1 to 5 carbon atoms and m and n is each an integer of 1 or more; and an adhesive for forming laminates based on the above polyisocyanate curing agent and an active hydrogen-group containing resin.

10 Claims, No Drawings

POLYISOCYANATE CURING AGENT FOR LAMINATE ADHESIVE, AND LAMINATE ADHESIVE USING THE SAME

BACKGROUND OF THE INVENTION (1) Field of the Invention

The present invention relates to a polyisocyanate curing agent for laminate adhesive, as well as to a laminate adhesive using the curing agent. More particularly, the present invention relates to a polyisocyanate curing agent for laminate adhesive, having a particular nonionic hydrophilic group, as well as to a laminate adhesive comprising the curing agent and an active hydrogen group-containing resin.

(2) Related Prior Art

Recently, as a packaging method, complex flexible packaging has been remarkably developed for reasons such as strength of package, protectability for goods packed, workability during packaging, propaganda effect of package, reduction of packaging cost caused by the use of a film supplied in a large amount at a low cost, and the like. In the complex flexible packaging, there is used a laminated film produced using an adhesive. The current main stream of such a laminate adhesive is a two-pack type polyurethane adhesive composed of a base resin having active hydrogen group and a curing agent having isocyanate group, because the two-pack type polyurethane adhesive is excellent in adhesivity, durability and heat resistance and further it can be widely applied to various kinds of films.

As such a laminate adhesive, there is disclosed in, for example, JP-A-5-112766, a solvent type two-pack adhesive comprising a hydrophilic group-containing polyurethane compound and a polyisocyanate compound. Also in JP-A-7-48429 is disclosed a hydrophilic group-containing, self-emulsifiable polyisocyanate composition and an aqueous adhesive composition using the polyisocyanate composition.

When the polyisocyanate compound described in JP-A-5-112766 is combined with the hydrophilic group-containing polyurethane compound (a base resin) described in the same literature, however, the resulting adhesive is insufficient in adhesivity to metal foils, metal-deposited films and polyolefin films. Further, the aqueous adhesive composition described in JP-A-7-48429 requires a large amount of energy for vaporizing the water contained therein.

Meanwhile, use of a coupling agent for adhesivity improvement is proposed in, for example, JP-A-63-110272. That is, in this literature is proposed a composite laminate adhesive composition comprising:

a polyol such as polyether polyol, polyester polyol, polyether urethane polyol, polyester urethane polyol or the like, an isocyanate group-containing silane coupling agent, and a polyisocyanate compound.

Owing to the diversification of eating habits in recent years, the quality requirements for the laminated films used for packaging of various foods have become higher, and, for example, resistance to severe retort treatment is required. The technique described in JP-A-63-110272, however, has been unable to provide a laminated film satisfying the above requirement.

SUMMARY OF THE INVENTION

The present invention aims at providing a polyisocyanate curing agent used in a laminate adhesive superior in storage stability, heat resistance, durability and adhesivity particularly to metallic films and polyolefin films; and a laminate adhesive using the curing agent.

The present invention lies in the following (1) to (4).

(1) A polyisocyanate curing agent for laminate adhesive, comprising:

(A) an isocyanate group-terminated prepolymer obtained by reacting an organic polyisocyanate containing at least (c) an aliphatic polyisocyanate and/or an alicyclic polyisocyanate, with (a) a block polyether monool represented by the following formula (1) wherein the oxypropylene group content is larger than the oxyethylene group content, and (B) a silane coupling agent represented by the following formula (2).

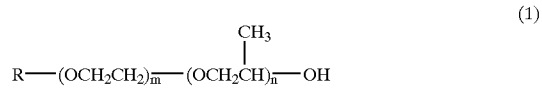

(wherein R is an alkyl group having 1 to 5 carbon atoms, and m and n are each an integer of 1 or more).

(wherein R' is a methyl group or an ethyl group, and r is an integer of 1 to 5).

(2) A polyisocyanate curing agent for laminate adhesive, comprising:

(A') an isocyanate group-terminated prepolymer obtained by reacting an organic polyisocyanate containing at least (c) an aliphatic polyisocyanate and/or an alicyclic polyisocyanate, with (a) a block polyether monool represented by the following formula (1) wherein the oxypropylene group content is larger than the oxyethylene group content and (b) an active hydrogen group-containing aliphatic compound other than the compound (a), and (B) a silane coupling agent represented by the following formula (2).

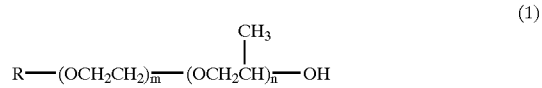

(wherein R is an alkyl group having 1 to 5 carbon atoms, and m and n are each an integer of 1 or more).

(wherein R' is a methyl group or an ethyl group, and r is an integer of 1 to 5).

(3) A laminate adhesive comprising a polyisocyanate curing agent set forth in the above (1) and an active hydrogen group-containing resin.

(4) A laminate adhesive comprising a polyisocyanate curing agent set forth in the above (2) and an active hydrogen group-containing resin.

DETAILED DESCRIPTION OF THE INVENTION

The present invention is described in detail below.

In the present invention, the isocyanate group-terminated prepolymer (A) or (A') can be obtained by reacting an organic polyisocyanate containing at least (c) an aliphatic polyisocyanate and/or an alicyclic polyisocyanate, with (a) a block polyether monool represented by the following formula (1) wherein the oxypropylene group content is larger than the oxyethylene group content by weight basis and, optionally, (b) an active hydrogen group-containing aliphatic compound other than the compound (a).

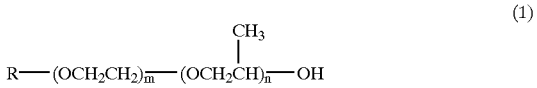
(1)

(wherein R is an alkyl group having 1 to 5 carbon atoms, and m and n are each an integer of 1 or more).

When in the block polyether monool (a) of the formula (1), R is an alkyl group having 6 or more carbon atoms, the polyisocyanate curing agent obtained from such a block polyether monool tends to give an adhesive low in adhesivity to adherend. When in the block polyether monool (a), the weight proportion of the oxyethylene group is larger than the weight proportion of the oxypropylene group, the resulting curing agent tends to give an adhesive low in water resistance.

The block polyether polyol (a) has a number-average molecular weight of preferably 800 or more, more preferably 800 to 5,000, particularly preferably 1,000 to 3,000. When the number-average molecular weight of (a) is smaller than the lower limit, the polyisocyanate curing agent obtained from (a) tends to give an adhesive low in adhesivity. When the number-average molecular weight of (a) is larger than the upper limit, the polyisocyanate curing agent obtained from (a) has an increased viscosity and tends to have lower workability.

The block polyether monool (a) can be obtained by a known method. That is, first, a monool and ethylene oxide are subjected to a ring-opening addition reaction to form a poly(oxyethylene)monool; then, the poly(oxyethylene) monool and propylene oxide are subjected to a ring-opening addition reaction.

As the monool as a starting material, there are preferably used aliphatic monools such as methanol, ethanol, n-propanol, isopropanol, n-butanol, isobutanol, tert-butanol and the like. Of these, methanol and ethanol are used more preferably.

In the present invention, it is possible to use, in combination with the block polyether monool (a), an active hydrogen group-containing aliphatic compound (b) other than (a) as necessary, in view of the affinity between curing agent and base resin and the adhesivity between different adherends.

As the active hydrogen group-containing aliphatic compound (b), there can be mentioned low-molecular monools such as methanol, ethanol, n-propanol, isopropanol, n-butanol, isobutanol, tert-butanol, pentanol, hexanol, heptanol, octanol, 2-ethylhexanol, benzyl alcohol, alkylene glycol monoalkyl ether and the like; low-molecular primary monoamines such as ethylamine, butylamine and the like; low-molecular secondary monoamines such as diethylamine, dibutylamine and the like; active hydrogen group-containing polyesters; active hydrogen group-containing polyethers having oxyalkylene group of 3 or more carbon atoms as recurring units; active hydrogen group-containing polycarbonates; active hydrogen group-containing polyolefins; hydroxy higher fatty acids having 6 or more carbon atoms, or esters thereof; and so forth. In the present invention, preferred as the active hydrogen group-containing aliphatic compound (b) is an aliphatic monool other than (a).

In the present invention, preferred as the aliphatic polyisocyanate and/or alicyclic polyisocyanate (c) are modifications of an aliphatic diisocyanate and/or an alicyclic diisocyanate, and more preferred are such modifications containing, in the molecule, at least one group selected from isocyanurate group, uretdione group, biuret group and allophanate group. Also, there can suitably be used modifications of an aliphatic diisocyanate and/or an alicyclic diisocyanate, containing in the molecule, at least one group selected from urethane group, urea group, carbodiimide group and uretonimine. As the aliphatic diisocyanate, there can be mentioned tetramethylene diisocyanate, hexamethylene diisocyanate, 2-methyl-1,5-pentanediisocyanate, 3-methyl-1,5-pentanediisocyanate, lysine diisocyanate, etc. As the alicyclic diisocyanate, there can be mentioned isophorone diisocyanate, hydrogenated diphenylmethane diisocyanate, hydrogenated tolylene diisocyanate, hydrogenated xylylene diisocyanate, hydrogenated tetramethylxylylene diisocyanate, cyclohexyl diisocyanate, etc. These diisocyanates can be used singly or in admixture of two or more kinds.

In the present invention, preferred as the aliphatic polyisocyanate and/or alicyclic polyisocyanate (c) is hexamethylene diisocyanate or an isocyanurate bond-containing polyisocyanate obtained from hexamethylene diisocyanate.

In the present invention, the aliphatic polyisocyanate and/or alicyclic polyisocyanate (c) can be used in combination with an organic polyisocyanate other than (c). As specific examples of such an organic polyisocyanate, there can be mentioned aromatic diisocyanates such as 2,4-tolylene diisocyanate, 2,6-tolylene diisocyanate, xylylene-1,4-diisocyanate, xylylene-1,3-diisocyanate, xylylene-1,2-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate and the like; polymeric polyisocyanates thereof; urethane bond-containing polyisocyanates derived from the above diisocyanates or polyisocyanates; biuret bond-containing polyisocyanates derived from the above diisocyanates or polyisocyanates; carbodiimide bond-containing polyisocyanates derived from the above diisocyanates or polyisocyanates; uretonimine bond-containing polyisocyanates derived from the above diisocyanates or polyisocyanates; uretdione bond-containing polyisocyanates derived from the above diisocyanates or polyisocyanates; and isocyanurate bond-containing polyisocyanates derived from the above diisocyanates or polyisocyanates. These diisocyanates and polyisocyanates can be used singly or in admixture of two or more kinds.

In the present invention, the reaction temperature employed in production of the isocyanate group-terminated prepolymer (A) or (A') is preferably 30 to 120° C., more preferably 40 to 100° C. Incidentally, in the above reaction, the active hydrogen group-containing aliphatic compound (b) used as necessary and the block polyether monool (a) may be reacted simultaneously with the organic polyisocyanate, or the compound (b) and the monool (a) may be reacted individually with the organic polyisocyanate. In the reaction, it is possible to use, as necessary, a urethanization catalyst such as dibutyltin dilaurate, triethylenediamine or the like.

In the isocyanate group-terminated prepolymer (A) or (A'), the block polyether monool (a) is introduced in such an amount that (a): (c) becomes preferably 1:100 to 80:100, more preferably 1.5:100 to 70:100 by weight ratio. When the compound (b) is used in combination with (a), the compound (b) is introduced in such an amount that (b):(c) becomes preferably 1:100 to 80:100, more preferably 1:100 to 70:100 by weight ratio. When the amount of the block polyether monool (a) introduced is smaller than the above lower limit, the adhesive obtained tends to have low adhesivity. When the amount is larger than the above upper limit, the isocyanate group content in the prepolymer (A) or (A') is low and accordingly the adhesive obtained tends to be low in adhesion strength.

The isocyanate group-terminated prepolymer (A) or (A') has an average functionality of preferably 2 to 5, more preferably 2.1 to 4.9. When the average functionality is too small, the adhesive obtained tends to give a cured material low in strength and durability. When the average functionality is too large, the adhesive obtained has too high crosslinkability and accordingly tends to give a fragile cured material.

The isocyanate group-terminated prepolymer (A) or (A') has an isocyanate group content of preferably 7 to 20% by weight, more preferably 8 to 18% by weight. When the isocyanate group content is too low, the adhesive obtained has low crosslinkability and accordingly tends to give a cured material low in strength and durability. When the isocyanate group content is too high, the amount of the block polyether monool (a) introduced into the isocyanate group-terminated prepolymer (A) or (A') is small and accordingly the adhesive obtained tends to show low adhesivity.

In the isocyanate group-terminated prepolymer (A) or (A'), the content of free organic polyisocyanate is preferably 1% by weight or less, more preferably 0.9% by weight or less. When the content of free organic polyisocyanate is too high, the adhesive obtained tends to have a short pot life or an offensive odor.

In the present invention, the silane coupling agent (B) is a compound represented by the following formula (2).

$$OCN-(CH_2)_r-Si(OR')_3 \quad (2)$$

(wherein R' is a methyl group or an ethyl group, and r is an integer of 1 to 5).

It is well known that by adding a silane coupling agent to an adhesive, the adhesive is improved in adhesivity, heat resistance, chemical resistance, etc. However, addition of a silane coupling agent to a base resin, particularly a base resin having a functional group such as amino group, epoxy group or the like may give rise to coloring and/or viscosity increase with the lapse of time. This is considered to be because the functional group of the base resin reacts with the alkoxysilane moiety or the like of the silane coupling agent. Further, since a silane coupling agent generally has a functional group such as amino group, epoxy group or the like, if the silane coupling agent and a polyisocyanate curing agent are stored in the form of a mixture, the isocyanate group of the curing agent reacts with the functional group of the silane coupling agent and, resultantly, an increase in viscosity may take place with the lapse of time.

Hence, in order for a laminate adhesive to have storage stability, it is advisable to store the adhesive in the form of individual components and mix them right before the use. This, however, needs a larger space for storage and an extra labor in mixing; therefore, a laminate adhesive of two-component type has been desired. Incidentally, when no silane coupling agent is used, an adhesive of two-component type is easily obtained; however, such an adhesive has insufficient adhesivity for obtaining a laminated film capable of withstanding a severe retort treatment. Therefore, a laminate adhesive for severe retort treatment needs to contain a silane coupling agent therein.

The silane coupling agent (B) used in the present invention has, as functional groups, —NCO and Si—OR' (wherein R' is a methyl group or an ethyl group). Therefore, it does not react with the isocyanate group-terminated prepolymer (A) or (A') under ordinary storage conditions. As a result, the polyisocyanate curing agent of the present invention has good storage stability.

In the laminate adhesive of the present invention, the base resin is not critical as long as it is an active hydrogen group-containing resin. There can be mentioned, for example, polyurethane resins, polyester resins, polyamide resins, acrylic resins, coumarone resins, melamine resins, urea resins, rosin resins, epoxy resins, phenolic resins, polyvinyl alcohols, vinyl acetate resins, polyvinyl chloride resins, ethylene-vinyl acetate resins, nitrile resins, cellulose resins (e.g. nitrocellulose), natural resins (e.g. starch and glue) and petroleum resins. Of these resins, polyurethane resins are preferred in view of the adhesivity to adherend, durability, etc. of the resulting adhesive.

The active hydrogen group-containing resin as the base resin preferably has a number-average molecular weight of 500 to 100,000 particularly 1,000 to 80,000.

The polyurethane resin as the base resin includes polyurethane resins containing urethane bond alone, polyurethane urea resins containing urethane bond and urea bond, etc.

The polyurethane resin as the base resin contains at least one, preferably at least two active hydrogen groups (e.g. hydroxyl groups). In the present invention, the polyurethane resin is mixed with a polyisocyanate curing agent having particular hydrophilic group, and the resulting mixture can be suitably used as a two-pack type curable laminate adhesive.

The polyurethane resin can be obtained by a reaction between an active hydrogen group-containing compound and an organic polyisocyanate.

The active hydrogen group-containing compound contains a long-chain polyol and a chain extender, and there is preferred such a compound containing the long-chain polyol in a proportion of 50 to 90% by weight.

As the long-chain polyol, there can be mentioned a polyester polyol, a polyester amide polyol, a polycarbonate polyol, a polyether polyol, a polyolefin polyol, an animal- or plant-derived polyol, their copolyols, etc. In the present invention, a polyester polyol is preferred in view of the adhesivity, durability, etc. of the adhesive obtained. These long-chain polyols may be used singly or in admixture of two or more kinds.

The long-chain polyol has a number-average molecular weight of preferably 500 to 10,000.

As the polyester polyol and the polyester amide polyol, there can be mentioned those compounds obtained by subjecting the following two kinds of compounds to a dehydration-condensation reaction:

at least one kind of compound selected from polycarboxylic acids (e.g. succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid and trimellitic acid), acid esters, acid anhydrides, etc., and at least one kind of compound selected from low-molecular polyols (e.g. ethylene glycol, 1,2-propanediol, 1,3-propanediol, 1,3-butanediol, 1,4-butanediol, 1,5-pentanediol, 1,6-hexanediol, 3-methyl- 1,5-pentanediol, neopentyl glycol, 1,8-octanediol, 1,9-nonanediol, diethylene glycol, dipropylene glycol, 1,4-cyclohexanedimethanol, ethylene oxide or propylene oxide adduct of bisphenol A, glycerine, trimethylolpropane and pentaerythritol), low-molecular polyamines (e.g. hexamethylenediamine, xylylenediamine and isophoronediamine), low-molecular aminoalcohols (e.g. monoethanolamine and diethanolamine), etc. Herein, the "low-molecular" of the above low-molecular polyols, low-molecular polyamines and low-molecular aminoalcohols refers to that these compounds have a number-average molecular weight of less than 500.

There can also be mentioned lactone type polyester polyols obtained by ring-opening polymerization of a cyclic ester (lactone) monomer such as ε-caprolactone, γ-valerolactone or the like using the above-mentioned low-molecular polyol as a starting material.

As the polycarbonate polyol, there can be mentioned those compounds obtained by an alcohol-eliminating or phenol-eliminating reaction between (a) the above-mentioned low-molecular polyol and (b) diethylene carbonate, dimethyl carbonate, diethyl carbonate, diphenyl carbonate or the like.

As the polyether polyol, there can be mentioned a polyethylene glycol, a polypropylene glycol and a polytetramethylene ether glycol, etc. all obtained by ring-opening polymerization of ethylene oxide, propylene oxide, tetrahydrofuran or the like; polyether polyols obtained by copolymerization of the above glycols; and polyester ether polyols produced using, as a starting material, the above-mentioned polyester polyol, polyester amide polyol or polycarbonate polyol.

As the polyolefin polyol, there can be mentioned a hydroxyl group-containing polybutadiene, a hydrogenated hydroxyl group-containing polybutadiene, a hydroxyl group-containing polyisoprene, a hydrogenated hydroxyl group-containing polyisoprene, a hydroxyl group-containing chlorinated polypropylene, a hydroxyl group-containing chlorinated polyethylene, etc.

As the animal- or plant-derived polyol, there can be mentioned a dehydrated castor oil-derived polyol, a castor oil-derived polyol, a silk fibroin, etc.

As the long-chain polyol, there can also be suitably used polyols or resins of 500 to 10,000 in number-average molecular weight, having two or more active hydrogen groups in the molecule, such as dimer acid type polyol, hydrogenated dimer acid type polyol, polyester resin, polyamide resin, acrylic resin, coumarone resin, melamine resin, urea resin, rosin resin, epoxy resin, phenolic resin, cellulose resin (e.g. cellulose), natural resin (e.g. starch or glue), polyvinyl alcohol and the like.

The chain extender is a compound of less than 500 in number-average molecular weight, having two or more active hydrogen groups in the molecule. There can be mentioned the above-mentioned low-molecular polyols, low-molecular polyamines and low-molecular aminoalcohols, etc. These compounds can be used singly or in admixture of two or more kinds.

As the organic polyisocyanate used in synthesis of the polyurethane resin, there can be mentioned, for example, the organic diisocyanates used in production of the above-mentioned polyisocyanate curing agent for laminate adhesive, and modifications thereof.

In synthesis of the polyurethane resin, the molar ratio of the isocyanate group of organic polyisocyanate and the active hydrogen group of active hydrogen group-containing compound is preferably 0.6:1 to 1:0.6. In synthesis of the polyurethane resin, it is important to (a) decide such conditions as to cause no gelling between the average functional groups (average isocyanate groups) of organic polyisocyanate and the average functional groups (average active hydrogen groups) of active hydrogen group-containing compound and (b) blend individual raw materials so as to satisfy the above-decided conditions. This blending ratio can be determined according to the gelling theory proposed by J. P. Flory, Khun, etc.; actually, however, the raw materials are reacted according to a blending ratio selected in view of the reactivity of the reactive groups contained in the molecules of the active hydrogen group-containing compound and the organic polyisocyanate, whereby a polyurethane resin can be synthesized with no gelling.

The synthesized polyurethane resin contains active hydrogen group or isocyanate group and has a number-average molecular weight of preferably 800 to 100,000, particularly preferably 1,000 to 80,000. When the number-average molecular weight is too large, the resin has too high a viscosity and has inferior workability. When the number-average molecular weight is too small, the adhesive produced from the resulting resin shows an insufficient adhesion strength.

In producing the polyurethane resin, there can be used known methods, for example, an in-solution reaction method which comprises reacting raw materials in an organic solvent, and a solvent-free reaction method which comprises mixing raw materials sufficiently in a solvent-free state and reacting them.

There can also be used known methods such as a one-shot method which comprises reacting an active hydrogen group-containing compound and an organic polyisocyanate at once, and a prepolymer method which comprises reacting an active hydrogen group-containing compound and an organic polyisocyanate with the isocyanate group being present in excess, to synthesize an isocyanate group-terminated prepolymer and then reacting the prepolymer with an active hydrogen group-containing compound.

In the one-shot method, the molar ratio of isocyanate group and active hydrogen group is preferably 0.5 to 2, more preferably 0.8 to 1.5. When the molar ratio is less than 0.5, the resulting polyurethane resin has too small a molecular weight, resulting in insufficient durability. When the molar ratio is more than 2, the organic polyisocyanate is used in the reaction system in an amount more than required in the reaction.

In the prepolymer method, the molar ratio of isocyanate group and active hydrogen group in prepolymer synthesis is preferably 1.1 to 5.0, more preferably 1.5 to 4.0. When the molar ratio is less than 1.1, the resulting prepolymer has too large a molecular weight, making it difficult to proceed to the next step. When the molar ratio is more than 5.0, the adhesive produced using the resulting polyurethane resin has inferior adhesivity.

In the prepolymer method, as the active hydrogen group-containing compound to be reacted with the isocyanate group-terminated prepolymer, there can be mentioned, the above-mentioned low-molecular polyols, low-molecular polyamines and low-molecular aminoalcohols, etc. As necessary, there can be used, as part of the above active hydrogen-group containing compound, a terminal-blocking agent such as monoamine (e.g. ethylamine, diethylamine or aniline), monool (e.g. methanol or ethanol) or the like.

In synthesis of the isocyanate group-terminated prepolymer or the polyurethane resin, it is possible to use a catalyst, a stabilizer or the like, ordinarily used in synthesis of polyurethane resin. As such a catalyst, there can be mentioned tertiary amines such as triethylamine, triethylenediamine and the like; metal salts such as potassium acetate, zinc stearate and the like; and organometal compounds such as dibutyltin dilaurate, dibutyltin oxide and the like. As the stabilizer, there can be mentioned, for example, ultraviolet stabilizers such as substituted benztriazole and the like, and thermal oxidation stabilizers such as phenol derivative and the like.

The reaction temperature of the urethanization is preferably 10 to 120° C., more preferably 30 to 100° C.

In the polyisocyanate curing agent for laminate adhesive and the laminate adhesive both of the present invention, there can be compounded, as necessary, additives ordinarily used in adhesives. Such additives include, for example, a pigment, a dye, a coupling agent, a blocking inhibitor, a dispersing and stabilizing agent, a viscosity-controlling agent, a leveling agent, a gelling inhibitor, a light stabilizer, an antioxidant, an ultraviolet absorber, a heat resistance improver, a plasticizer, an antistatic agent, a reinforcing agent, a catalyst, a thixotropic agent, a microbicide, a fungicide, a lubricant, and an inorganic or organic filler.

As the compounding method, a known method such as stirring, dispersion or the like can be used.

In the polyisocyanate curing agent for laminate adhesive and the laminate adhesive both of the present invention, there can be used an organic solvent for viscosity control or for wettability improvement. As the organic solvent, there can be mentioned aromatic hydrocarbon type solvents such as toluene, xylene, Swasol (an aromatic hydrocarbon solvent produced by Cosmo Oil Co., Ltd.), Solvesso (an aromatic hydrocarbon solvent produced by EXXON Chemical K. K.) and the like; ketone type solvents such as acetone, methyl ethyl ketone, methyl isobutyl ketone, cyclohexanone and the like; ester type solvents such as ethyl acetate, butyl acetate, isobutyl acetate and the like; glycol ether ester type solvents such as ethylene glycol ethyl ether acetate, propylene glycol methyl ether acetate, 3-methyl-3-methoxybutyl acetate, ethyl 3-ethoxypropionate and the like; and ether type solvents such as tetrahydrofuran, dioxane and the like. These solvents can be used singly or in admixture of two or more kinds.

The compounding ratio of the active hydrogen group-containing resin and the polyisocyanate curing agent is preferably 100:1 to 100:200, particularly preferably 100:5 to 100:180 by weight ratio. When the amount of the polyisocyanate curing agent used is too small, the resulting adhesive gives a cured material of insufficient durability. When the amount is too large, the cured material has insufficient flexibility. Therefore, such amounts are inadequate.

The laminate adhesive of the present invention shows good adhesivity to metals and polyolefins; therefore, it is useful particularly in production of a laminated film using metal foils, metal-deposited films or polyolefin films. Further, the laminate adhesive is superior in adhesivity to various adherends, durability, etc.; therefore, it can be used also in production of various products such as plywood, furniture, automobile, railroad vehicle, electric or electronic appliance, nonwoven fabric, shoe, bag and the like.

As the film to which the laminate adhesive of the present invention can be applied preferably, there can be mentioned, for example, polymer films such as stretched polypropylene, non-stretched polypropylene, polyethylene terephthalate, polybutylene terephthalate, polyethylene naphthylate, polybutylene naphthylate, nylon, low-density polyethylene, medium-density polyethylene, high-density polyethylene, ethylene-vinyl acetate copolymer, ethylene-vinyl alcohol copolymer, polyvinyl chloride, polyvinyl alcohol, polystyrene, polycarbonate, polyvinylidene chloride, cellophane and the like; metal foils of aluminum, copper, etc.; metal-deposited films obtained by vapor-depositing such a metal on one of the above polymer films; papers; and polymer-coated films obtained by coating a polymer on one of the above films.

The polymer films are preferable because improved adhesivity is obtained when they are subjected to a surface treatment such as corona-discharging treatment or the like. In the polymer-coated films, consideration must be made on the kind and amount of polymer coated, and the surface property of the film obtained.

In producing a laminated film using the laminate adhesive of the present invention, there can be employed known methods such as wet lamination, dry lamination, hot-melt lamination, extrusion lamination, non-solvent lamination and the like.

The amount of the laminate adhesive applied to a film (an adherend) is preferably 0.5 to 10 $g/m^2$, more preferably 1 to 8 $g/m^2$ in terms of resin amount. When the amount applied is outside of the range, the resulting laminated film has an insufficient adhesion strength.

The laminated film using the present laminate adhesive can be produced, for example, as follows.

First, the present laminate adhesive is coated on a film and as necessary dried, and such films are laminated to each other. Then, the resulting laminate is as necessary pressed or heated to promote the curing reaction of the adhesive. In this case, a preferred pressure is 0.01 to 2 MPa and a preferred temperature is 40 to 150° C.

By such a method, there can be produced a laminated film wherein two or more films are laminated.

As described above, the polyisocyanate curing agent of the present invention is superior particularly in storage stability, and the laminate adhesive of the present invention is superior in adhesivity particularly to metal adherends as well as in durability.

DESCRIPTION OF THE PREFERRED EMBODIMENTS

The present invention is described in more detail below by way of Examples. However, the present invention is in no way restricted to these examples. Incidentally, "%" in Synthesis Examples, Examples and Comparative Examples refers to "% by weight" unless otherwise specified.

Production of Polyisocyanate Curing Agents

EXAMPLE 1

601 g of Coronate (registered trade mark) HX produced by Nippon Polyurethane Industry Co., Ltd. and 399 g of a monool (1) were fed into a 2-liter reactor provided with a stirrer, a thermometer, an Allihn condenser and a nitrogen gas-introducing tube, and a reaction was allowed to take place at 70° C. for 3 hours. Thereinto was fed 1 g of a coupling agent (1) to produce a polyisocyanate curing agent A.

The polyisocyanate curing agent A had a viscosity of 2,720 mPa·s at 25° C. and an isocyanate group content of 11.1%. The polyisocyanate curing agent A was stored in a dark place at 25° C. for 1 month to examine the storage stability. As a result, no change in appearance was observed.

EXAMPLES 2 TO 6 AND COMPARATIVE EXAMPLES 1 TO 2

Using the raw materials shown in Table 1, polyisocyanate curing agents B to H were produced in the same manner as in Example 1. The polyisocyanate curing agents B to H were stored in a dark place at 25° C. for 1 month to examine their storage stabilities visually.

The results are shown in Table 1.

The standard for evaluation of storage stability was as follows.
- ○: There is no change in appearance (neither solidification, nor appearance of precipitate or suspended matter is seen).
- X: There is a change in appearance (solidification, or appearance of precipitate or suspended matter is seen).

As is clear from Table 1, the polyisocyanate curing agents of the present invention showed good storage stability. In contrast, the polyisocyanate curing agent H containing an amino group-containing coupling agent was inferior in storage stability.

TABLE 1

|  | Examples | | | | | | Comparative Examples | |
|---|---|---|---|---|---|---|---|---|
|  | 1 | 2 | 3 | 4 | 5 | 6 | 1 | 2 |
| Aliphatic polyisocyanate (g) | | | | | | | | |
| Coronate HX | 601 | 493 | 648 | 567 | 685 | 781 | 860 | 720 |
| Polyether monool (g) | | | | | | | | |
| Monool (1) | 399 | | | 376 | | | | |
| Monool (2) | | 507 | | | 315 | | | |
| Monool (3) | | | 352 | | | 219 | | |
| Monool (4) | | | | | | | 140 | 140 |
| Active hydrogen group-containing aliphatic compound (g) | | | | | | | | |
| Monool (5) | | | | | 57 | | | 140 |
| Silane coupling agent (g) | | | | | | | | |
| Coupling agent (1) | 1 | 5 | | | 0.5 | | | |
| Coupling agent (2) | | | 3 | 0.5 | | 1 | | |
| Coupling agent (3) | | | | | | | | 1 |
| Polyisocyanate curing agent | A | B | C | D | E | F | G | H |
| Isocyanate group content (%) | 11.1 | 8.4 | 12.5 | 9.9 | 13.6 | 16.1 | 16.9 | 12.0 |
| Viscosity (mPa · s/25° C.) | 2720 | 2800 | 2420 | 2600 | 2300 | 2200 | 2380 | 2720 |
| Storage stability | ○ | ○ | ○ | ○ | ○ | ○ | ○ | X |

In Examples 1 to 6, Comparative Examples 1 to 2 and Table 1,

Coronate HX: an isocyanurate bond-containing polyisocyanate obtained from hexamethylene diisocyanate, isocyanate group content=21.3%, viscosity=1,500 mPa·s/25° C.

Monool (1): a monool obtained by adding propylene oxide to a methoxypolyethylene glycol having a number-average molecular weight of 400, number-average molecular weight=1,100

Monool (2): a monool obtained by adding propylene oxide to a methoxypolyethylene glycol having a number-average molecular weight of 400, number-average molecular weight=1,400

Monool (3): a monool obtained by adding propylene oxide to a methoxypolyethylene glycol having a number-average molecular weight of 700, number-average molecular weight=1,700

Monool (4): a methoxypolyethylene glycol, number-average molecular weight=400

Monool (5): methyl ricinoleate

Coupling agent (1): γ-isocyanatopropyltrimethoxysilane

Coupling agent (2): silane γ-isocyanatopropyltriethoxysilane

Coupling agent (3): γ-aminopropyltrimethoxysilane

[Synthesis of Polyurethane Resin]

Synthesis Example 1

Into the same reactor as used in Example 1 were fed 246 g of a polyol A, 13 g of NPG and 200 g of ethyl acetate, and the polyol A and the NPG were dissolved in ethyl acetate at 30° C. Thereinto were fed 41 g of TDI and 0.03 g of DOTDL, and a urethanization reaction was allowed to take place at 80° C. for 4 hours. As the reaction proceeded, the viscosity of the reaction system increased; therefore, ethyl acetate was added in portions. When the disappearance of isocyanate group peak was confirmed by infrared absorption analysis, 350 g of ethyl acetate was added for dilution, whereby a polyurethane resin solution PU-1 having a solid content of 50% was obtained.

In Synthesis Example 1,

Polyol A: a polyester diol obtained from ethylene glycol/neopentyl glycol=1/1 (molar ratio) and adipic acid/isophthalic acid=1/1 (molar ratio), number-average molecular weight=2,000

NPG: neopentyl glycol

TDI: 2,4-tolylene diisocyanate

DOTDL: dioctyltin dilaurate

[Production of Laminate Adhesives]

EXAMPLES 7 TO 12 AND COMPARATIVE EXAMPLES 3 TO 4

The polyurethane resin solution PU-1 and one of the polyisocyanate curing agents A to H were compounded at a solid content ratio of 100:5 to produce laminate adhesives AD-1 to AD-8.

[Measurements of Adhesion Strengths]

These measurements were made for each of the laminate adhesives AD-1 to AD-8. A corona-treated PET film (film thickness: 12μ), an aluminum foil (film thickness: 7μ) and a corona-treated CPP film (film thickness: 70μ) were set in a dry laminator. One of the laminate adhesives AD-1 to AD-8 was coated on the corona-treated surface of the corona-treated PET film using a gravure roll so that the as-dried amount of the adhesive coated became 3.5 g/m². The coated PET film was passed through a drying furnace of 80° C. and laminated with the aluminum foil using a lamination roll of 100° C.×0.3 MPa. On the aluminum foil surface of the resulting laminate was coated the same laminate adhesive using a gravure roll so that the as-dried amount of the adhesive coated became 3.5 g/m². The coated laminate was passed through a drying furnace of 80° C. and laminated with the corona-treated surface of the corona-treated CPP film using a lamination roll of 100° C.×0.3 MPa. The film speed was 50 m/min. Thereafter, aging was conducted at 40° C. for 3 days to obtain various laminated films.

Each laminated film was cut into a 15-mm width and the cut sample was subjected to a T-peel test under the conditions of pulling speed=300 mm/min and measurement atmosphere=25° C.×50% R.H.

Further, two same laminated films were laminated with each other so that the CPP film was at the inner side, and the three sides of the laminate were heat-sealed under the conditions of 180° C.×0.3 MPa×1 second to form a bag. In this bag was placed a ketchup/salad oil/vinegar (1/1/1 by weight ratio) mixture. The unsealed side of the bag was heat-sealed under the above conditions. The resulting bag was subjected to a severe retort treatment of 135° C.×20 minutes. Then, the laminated film constituting the bag was subjected to a T-peel test under the conditions of sample width=15 mm, pulling speed=300 mm/min and measurement atmosphere=25° C.×50% R.H.

The results are shown in Table 2.

TABLE 2

|  | Examples | | | | | | Comparative Examples | |
| --- | --- | --- | --- | --- | --- | --- | --- | --- |
|  | 7 | 8 | 9 | 10 | 11 | 12 | 3 | 4 |
| Polyisocyanate curing agents (solid content, g) | | | | | | | | |
| A | 5 | | | | | | | |
| B | | 5 | | | | | | |
| C | | | 5 | | | | | |
| D | | | | 5 | | | | |
| E | | | | | 5 | | | |
| F | | | | | | 5 | | |
| G | | | | | | | 5 | |
| H | | | | | | | | 5 |
| Polyurethane resin solutions (solid content, g) | | | | | | | | |
| PU-1 | 100 | 100 | 100 | 100 | 100 | 100 | 100 | 100 |
| Laminate adhesives | AD-1 | AD-2 | AD-3 | AD-4 | AD-5 | AD-6 | AD-7 | AD-8 |
| Adhesion strength (N/cm) | | | | | | | | |
| PET/Al[1)] | 2.9 | 3.0 | 3.1 | 2.9 | 3.4 | 3.3 | 3.3 | 3.1 |
| Al/CPP | 6.9 | 6.8 | 6.7 | 6.8 | 7.2 | 6.8 | 6.8 | 6.7 |
| Adhesion strength after severe retort treatment (N/cm) | | | | | | | | |
| PET/Al | P.I. | P.I. | P.I. | P.I. | P.I. | P.I. | P.I. | P.I. |
| Al/CPP | 6.5 | 6.4 | 6.3 | 7.0 | 6.9 | 6.7 | 3.4 | 6.6 |

P.I. refers to that peeling is impossible.
[1)]: In the measurement of adhesion strength of PET film/aluminum foil, the PET film ruptured in all of Examples 7 to 12 and Comparative Examples 3 and 4.

In Examples 7 to 12, Comparative Examples 3 to 4 and Table 2,
PET: a polyethylene terephthalate
Al: aluminum
CPP: an unstretched polypropylene As is clear from Table 2, all of the laminate adhesives using a polyisocyanate curing agent of the present invention showed good adhesivity; however, the adhesive AD-7 using no coupling agent was low in adhesion strength after severe retort treatment.

What is claimed is:

1. A polyisocyanate curing agent for laminate adhesive, comprising:

(A) an isocyanate group-terminated prepolymer obtained by reacting an organic polyisocyanate containing at least one of (c) an aliphatic polyisocyanate or an alicyclic polyisocyanate, with (a) a block polyether monool represented by the following formula (1) wherein the oxypropylene group content is larger on a weight basis than the oxyethylene group content, and (B) a silane coupling agent represented by the following formula (2):

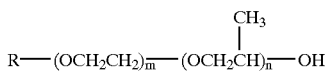
(1)

(wherein R is an alkyl group having 1 to 5 carbon atoms, and m and n are each an integer of 1 or more):

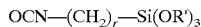
(2)

(wherein R' is a methyl group or an ethyl group, and r is an integer of 1 to 5).

2. The polyisocyanate curing agent for laminate adhesive according to claim 1, wherein the block polyether monool (a) has a number-average molecular weight of 800 or more.

3. The polyisocyanate curing agent for laminate adhesive according to claim 1, wherein the organic polyisocyanate is (c) an aliphatic polyisocyanate and/or an alicyclic polyisocyanate.

4. The polyisocyanate curing agent for laminate adhesive according to claim 1, wherein the organic polyisocyanate is a modified polyisocyanate obtained from an aliphatic diisocyanate and/or an alicyclic diisocyanate.

5. The polyisocyanate curing agent for laminate adhesive according to claim 1, wherein the organic polyisocyanate is an isocyanurate bond-containing polyisocyanate obtained from an aliphatic diisocyanate.

6. A polyisocyanate curing agent for laminate adhesive, comprising:
  (A') an isocyanate group-terminated prepolymer obtained by reacting an organic polyisocyanate containing at least one of (c) an aliphatic polyisocyanate or an alicyclic polyisocyanate, with (a) a block polyether monool represented by the following formula (1) wherein the oxypropylene group content is larger on a weight basis than the oxyethylene group content and (b) an active hydrogen group-containing aliphatic compound other than the compound (a), and
  (B) a silane coupling agent represented by the following formula (2):

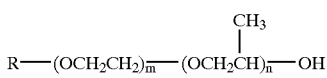
(1)

(wherein R is an alkyl group having 1 to 5 carbon atoms, and m and n are each an integer of 1 or more):

(2)

(wherein R' is a methyl group or an ethyl group, and r is an integer of 1 to 5).

7. The polyisocyanate curing agent for laminate adhesive according to claim 6, wherein the block polyether monool (a) has a number-average molecular weight of 800 or more.

8. The polyisocyanate curing agent for laminate adhesive according to claim 6, wherein the organic polyisocyanate is (c) an aliphatic polyisocyanate and/or an alicyclic polyisocyanate.

9. The polyisocyanate curing agent for laminate adhesive according to claim 6, wherein the organic polyisocyanate is a modified polyisocyanate obtained from an aliphatic diisocyanate and/or an alicyclic diisocyanate.

10. The polyisocyanate curing agent for laminate adhesive according to claim 6, wherein the organic polyisocyanate is an isocyanurate bond-containing polyisocyanate obtained from an aliphatic diisocyanate.

* * * * *